United States Patent [19]

Fultz

[11] Patent Number: 4,986,712

[45] Date of Patent: Jan. 22, 1991

[54] FASTENER ASSEMBLY

[75] Inventor: Robb M. Fultz, Huntington, Ind.

[73] Assignee: Emhart Industries, Inc., Towson, Md.

[21] Appl. No.: 452,541

[22] Filed: Dec. 18, 1989

[51] Int. Cl.⁵ .................. F16B 37/00; F16B 43/00
[52] U.S. Cl. .................................. 411/428; 411/432; 411/533
[58] Field of Search ............... 411/428, 432, 533, 368, 411/369, 916, 375, 430; 10/86 F; 301/9 DN

[56] References Cited

U.S. PATENT DOCUMENTS

| Re. 19,492 | 3/1935 | Winchester et al. | |
|---|---|---|---|
| 183,324 | 10/1876 | Pratt . | |
| 515,089 | 2/1894 | McClelland . | |
| 1,961,470 | 6/1934 | Winchester et al. | |
| 2,588,372 | 3/1952 | Erb . | |
| 2,633,176 | 3/1953 | Fears | 411/432 |
| 3,016,941 | 1/1962 | Coldren . | |
| 3,087,371 | 4/1963 | Orner . | |
| 3,135,154 | 6/1964 | Zenzic . | |
| 3,144,803 | 8/1964 | Briles . | |
| 3,220,453 | 11/1965 | Greeno . | |
| 3,366,421 | 1/1968 | Bradley | 301/9 DN |
| 3,386,771 | 6/1968 | Verdier et al. | 411/533 |
| 3,421,563 | 1/1969 | Koss . | |
| 3,476,010 | 11/1969 | Markey . | |
| 3,550,498 | 12/1970 | Briles | 411/432 |
| 3,659,491 | 5/1972 | Duffy et al. . | |
| 3,742,808 | 7/1973 | Trembley | 411/432 |
| 4,362,449 | 12/1982 | Hlinsky . | |
| 4,717,299 | 1/1988 | Underwood . | |

Primary Examiner—Neill R. Wilson
Attorney, Agent, or Firm—Spencer T. Smith

[57] ABSTRACT

A flanged nut is received by a cup washer which is slightly larger than the flanged nut to allow rotation of the nut relative to the washer. The cup washer is deformed (staked) to capture the nut about its flanged periphery. The nut is designed to rotate relative to the washer during assembly to assure two known, constant bearing surfaces regardless of the nature of the panel surface beneath the washer. The flanged nut has a large nut-to-washer bearing area capable of optimizing stress distribution at high loads.

4 Claims, 1 Drawing Sheet

FASTENER ASSEMBLY

A fastener assembly including a nut and a washer which is capable of producing a uniform, predictable tension in a bolted joint by application of a specified torque regardless of the nature of the bearing surface in contact with the bottom of the washer (steel, painted steel, rusted steel, aluminum, for example) to which i&: is being fastened.

It is highly desirable to be able to obtain a uniform predictable tension by tightening a nut to a predetermined torque in a variety of applications. An operator could then dependably secure a joint by applying a specified torque without concern for the type of panel or its condition.

It is accordingly an object of the present invention to provide a fastener assembly having two known, constant bearing surfaces in order to reduce variations in torque at assembly tension loads.

A second object of the present invention is to provide optimized distribution of tensile forces from the nut threads to the bearing surface of the mating part by means of a large bearing area produced between a flanged nut and a cup washer.

A third object of the present invention is to provide a rigid assembly capable of producing and distributing high tensile loads without detriment to the nut-washer assembly.

Other objectives and advantages of the present invention will become apparent from the following portion of the specification and from the following drawings which illustrate in accordance with the mandate of the patent statutes a presently preferred embodiment incorporating the principles of the invention.

Referring to the drawings.

Figure 1:
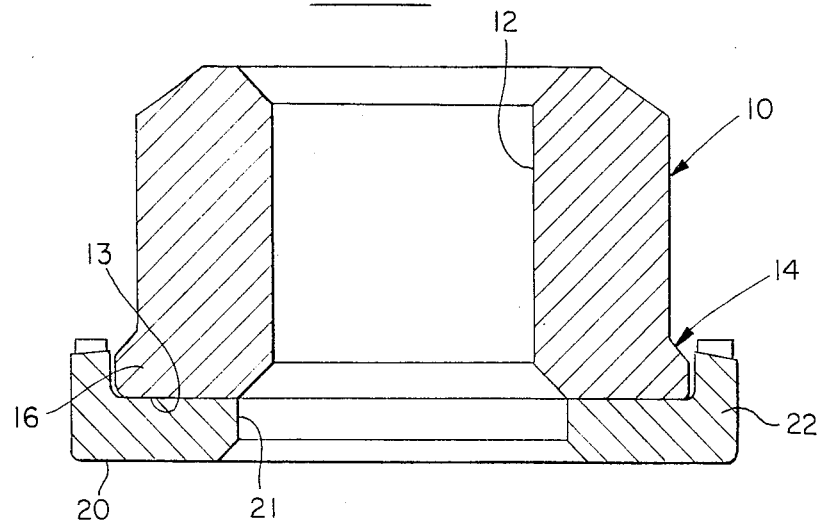
FIG. 1 is a cross sectional view of the fastener assembly made in accordance with the teachings of the present invention.

A medium duty nut 10 made from 1035 steel 26-32 RC has an internal threaded bore 12. The nut has a flat bottom surface 13 and the nut base 14 has an outwardly flanged portion 16 to increase the effective area of this base surface 13. The nut base 14 is received within a cup washer 20 which is made from 1035 steel having a hardness of 32-34 RC and which has a central hole 21.

Figure 2:
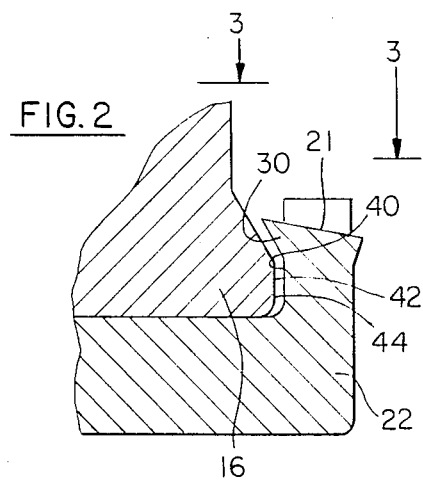
FIG. 2 is an enlarged view of the circled portion of the fastener assembly illustrated in FIG. 1.
Figure 3:
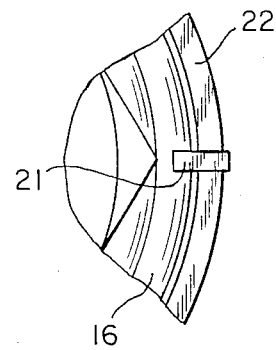
FIG. 3 is a view taken at 3—3 of FIG. 2.

While the base of the nut is captured within the cup washer 20 by staking 21 the top of the cylindrical side wall 22 of the cup washer 20 at a plurality (six) of equi-spaced locations (FIGS. 2 and 3) the base 14 of the nut 10 is spaced from the cylindrical side wall 22 of the cup washer and from the inwardly projecting portion 30 of the individual stakes 21 so that the nut can move slightly axially and radially relative to the cup washer. The flanged nut 10 can accordingly rotate relative to the cup washer 20. To facilitate relative rotation the cup washer 20 is covered with plain zinc 40 and the flanged nut has a cadmium base coating 42 with a top wax coating 44 so that the coefficient of friction between the work surface and the cup washer will be higher than the coefficient of friction between the washer and the nut (this can be achieved by variation in sizes of the bearing areas and configuration of bearing area at washer to work surface interface, eg. serrations or non-circular washer geometry). The nut will accordingly rotate relative to the stationary washer during final tightening.

I claim:

1. A fastener assembly comprising
   a flanged steel nut having an internal threaded bore and a flanged base portion having a washer engaging surface,
   a steel cup washer for receiving said flanged base portion, said steel cup washer having a flat bottom portion for engaging with said flanged nut washer engaging surface and having a cylindrical wall portion integral at one end with said washer bottom portion,
   the top surface of said cylindrical wall portion being staked at at least a plurality of locations to capture said flanged nut within said steel cup washer,
   the inner diameter of said cylindrical wall portion being selected to be slightly larger than the outer diameter of said flanged base portion and said stakes being spaced from said flanged base portion so that said base portion can be freely rotated within said steel cup washer,
   means for defining a coefficient of friction between the work surface and said steel cup washer higher than the coefficient of friction between said steel cup washer and said flanged nut so that said flanged nut will rotate relative to the stationary steel cup washer during final tightening, said defining means comprising a coating of zinc on said steel cup washer and a base coating of cadmium and a surface coating of wax on said steel flanged nut.

2. A fastener assembly according to claim 1, wherein said steel cup washer and said flanged nut are made from 1035 steel.

3. A fastener assembly according to claim 2, wherein the steel flanged nut hardness if 26-32 RC and the steel cup washer hardness if 32-34 RC.

4. A fastener assembly according to claim 2, wherein there are six equi-spaced stakes on the top surface of said cylindrical wall means.

* * * * *